United States Patent [19]

Leksén

[11] 4,324,113
[45] Apr. 13, 1982

[54] SLIDING BLOCK COUPLING

[75] Inventor: Lars F. Leksén, Smedjebacken, Sweden

[73] Assignee: Morgardshammar Aktiebolag, Smedjebacken, Sweden

[21] Appl. No.: 971,883

[22] Filed: Dec. 21, 1978

Related U.S. Application Data

[63] Continuation of Ser. No. 811,978, Jun. 30, 1977, abandoned.

[30] Foreign Application Priority Data

Jul. 6, 1976 [SE] Sweden .............................. 7607714

[51] Int. Cl.³ .............................................. F16D 3/16
[52] U.S. Cl. .............................................. 64/7; 64/6; 403/66
[58] Field of Search .............................. 64/7, 8, 16, 6; 403/292, 298, 66

[56] References Cited

U.S. PATENT DOCUMENTS

| | | | |
|---|---|---|---|
| 919,651 | 4/1909 | Spicer | 64/8 |
| 1,112,869 | 10/1914 | Tirrell | 64/8 |
| 1,346,253 | 7/1920 | Rayfield | 64/8 |
| 1,413,848 | 4/1922 | Frins | 64/7 |
| 1,527,958 | 2/1925 | Roberts | 64/8 X |
| 1,834,906 | 12/1931 | Smith et al. | 64/7 |
| 2,117,706 | 5/1938 | Cutting | 64/7 |
| 2,559,108 | 7/1951 | Boge, Sr. et al. | 64/8 |
| 2,752,766 | 7/1956 | Wildhaber | 64/8 X |
| 2,896,430 | 7/1959 | Olson | 64/7 |
| 3,001,387 | 9/1961 | Schultz | 64/8 X |
| 3,914,959 | 10/1975 | Leksen | 64/7 |
| 3,975,922 | 8/1976 | Orain | 64/8 X |

Primary Examiner—Robert Mackey
Attorney, Agent, or Firm—Young & Thompson

[57] ABSTRACT

A sliding block coupling has a coupling head which comprises devices for arranging an ingoing, driving, and an outgoing, driven, torque-transferring member which rotate together with the coupling head, and sliding blocks arranged in a cylindrical recess situated perpendicular to the rotation axis of the coupling head so as to, in cooperation with the coupling head, transfer torque from one of said members to the other. The devices for arranging one of the two torque-transferring members comprises structure arranged in the cylindrical recess in the coupling head, this structure transferring torque between the member in question and the sliding blocks, and being extended in the longitudinal direction of the recess and, at least in the proximity of both of its ends and on opposite sides of the same, being provided with projections or recesses on which or in which the sliding blocks are arranged between that structure and the wall in the cylindrical recess.

3 Claims, 7 Drawing Figures

SLIDING BLOCK COUPLING

This is a continuation of application Ser. No. 811,978, filed June 30, 1977, now abandoned.

The present invention relates to a sliding block coupling having a coupling head, comprising devices for arranging an ingoing, driving, and an outgoing, driven torque-transforming member which rotate together with the coupling head, and sliding blocks arranged in a cylindrical recess situated perpendicular to the rotation axis of the coupling head so as to, in cooperation with the coupling head, transfer torque from one of said members to the other.

In the known couplings of this kind, the coupling head is generally provided with two claws, which is necessary so that one of the torque-transmitting members - and then usually a so called spindle - shall be able to be arranged in the coupling head with its flared end projecting into the coupling and cooperating with sliding blocks.

As regards transferable torque, said claws weaken the known coupling heads simultaneously as they complicate the manufacture of the same and give rise to difficulties in causing the necessary grease for lubrication of the sliding blocks to remain inside the coupling heads.

On the basis of the type of known sliding block coupling described above, the present invention has the purpose of eliminating the above-mentioned disadvantages. In order to achieve said purpose, the present invention proposes that the devices for arranging one of the two torque-transferring members shall comprise a means arranged in a cylindrical recess in the coupling head, said means being torque-transferring between the members in question and sliding blocks, being extended in the longitudinal direction of the recess and, at least in the proximity of both sides - and on opposite sides of the same - being provided with projections or recesses in which the sliding blocks are arranged between the means and the wall in the cylindrical recess. By means of this combination of inventive characteristics, the head in a sliding block coupling according to the invention can be designed entirely without claws. This results in increased torque rigidity, simplified manufacture and lesser amount of assembly details compared to the previously known sliding block couplings of the kind in question. Furthermore, a greater degree of seal is obtained in the coupling head designed according to the invention. This contributes to the necessary lubricating grease more easily kept inside the same.

In an embodiment according to the invention, the means arranged in the cylindrical recess of the coupling head is - between its ends - provided with a recess or a bore in which one of the torque-transferring members, which suitably has the shape of a spindle, is in torque-transferring engagement with the means and is axially movable with one of its ends in the same. By means of this design, the spindle can easily be removed from and reinserted in the coupling head. By means of simple known connection arrangements on the opposite side of the coupling head, said coupling head can be both mounted onto and demounted from shaft pins without the head itself having to be disassembled. This also entails the further advantage that the lubricating grease spaces inside the head will not be disturbed. Furthermore, said embodiment according to the invention entails the advantage that the spindle can, in such couplings in which a coupling head is present at each end of the spindle, be removed and reinserted without the two coupling heads having to be removed from the shaft pins on which their opposite ends are arranged.

In order to, in terms of space, obtain well-restricted and functionally well-sealed lubricating grease spaces, an especially suitable embodiment of a sliding block seal according to the invention has annular seals arranged between the wall in the cylindrical recess in the coupling head and the means arranged in the same, said seals being situated inside the ends of the means provided with projections or recesses, both ends of the cylindrical recess being covered. In itself, said covering can be arranged in several different manners within the scope of the invention, but can be advantageously achieved by means of a casing surrounding the coupling head.

In the following, the invention shall be described in more detail with reference to the accompanying drawings showing an embodiment of a sliding block coupling according to the present invention.

Figure 1:
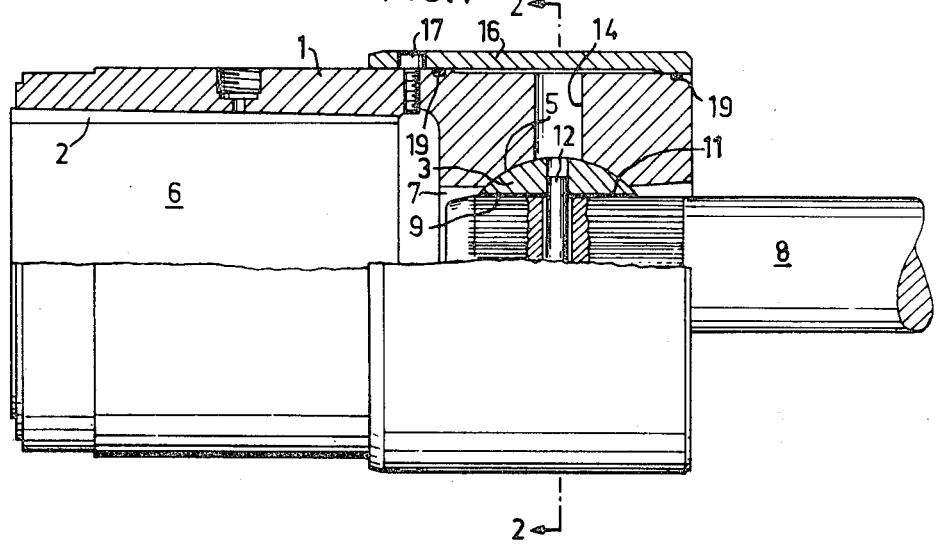
FIG. 1 is a partially cut side view of said coupling.

The drawings show that the shown embodiment of a sliding block coupling according to the present invention comprises a coupling head 1. This, in turn, comprises devices 2,3 for arranging an ingoing, driving, and an outgoing, driven, torque-transferring member rotating together with the coupling head, and sliding blocks 4 arranged in a cylindrical recess 5 positioned perpendicular to the rotation axis of the coupling head so as to, in cooperation with the coupling head, transfer torque from one of said members to the other. To be more precise, the shown coupling head 1 consists of a substantially cylindrical body intended to rotate about its geometrical axis. Both ends of said body are provided with axial bores 6 and 7 in which the driven and the driving torque-transferring members can be inserted to engage with the coupling head 1.

Figure 2:
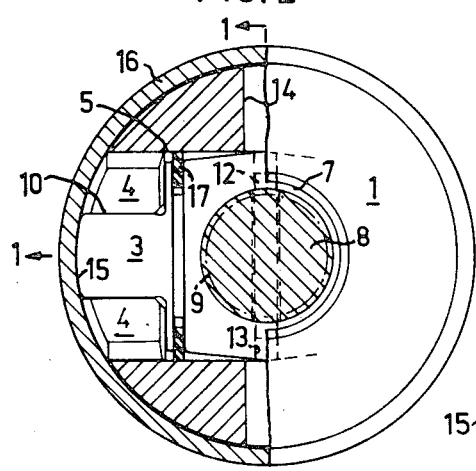
FIG. 2 is a partially cut end view of the same along the line 2—2 in FIG. 1.

In FIGS. 1 and 2, only one of both said torque-transferring members, namely a spindle 8, is shown, one end of said spindle being inserted in the axial bore 7, in which said spindle, via splines 9, is in torque-transferring engagement with the head 1 via a means 3 which, according to the invention, is included in said devices for arranging one of the two torque-transferring members and is arranged in the cylindrical recess 5 in the coupling head. The other torque-transferring member (not shown here) can, for example, consist of a shaft pin whose free end is insertable into the bore 6 in the coupling head where it suitably is engaged with the splines 2 which also are included in said devices for arranging both of the torque-transferring members, and is arranged in the wall of the bore 6 in the usual manner.

Figure 3:
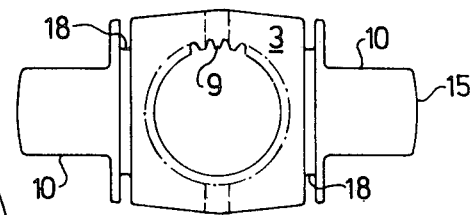
FIG. 3 is an end view of a means included in the coupling head of said coupling.
Figure 4:
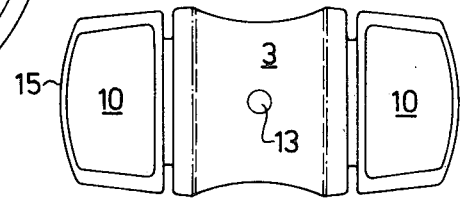
FIG. 4 is a plan view of said means and FIGS. 5, 6 and 7 show one of these sliding blocks as seen from one of its ends, from above and from behind, respectively.
Figure 5:
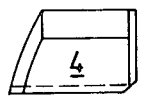
Figure 6:
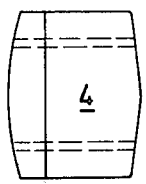
Figure 7:
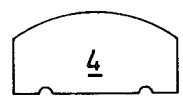

The means 3 is torque-transferring between the spindle 8 and the sliding blocks 4 and, for this purpose, is extended in the longitudinal direction of the recess 5 and, as is especially well-revealed by FIGS. 3 and 4, provided with projections or recesses bounded by flats 10 at least in the proximity of both of its sides or on opposite sides of the same, on or in which projections or recesses the sliding blocks 4 are arranged between the means in question and the wall in the cylindrical recess 5. In its middle, the means has a bore 11 corresponding to the bore 7 in the coupling head 1, in whose wall the splines 9 are arranged, with which an end of the spindle 8 projecting into the coupling head 1 is in torque-transferring engagement with corresponding splines. In order to be maintained axially in the means 3, the spindle 8 is held in the means by means of a locking pin 12 which is inserted in a bore 13 arranged diametrically through the means 3 and the spindle 8. In order to achieve locking, access to said bore 13 can be had through another bore 14 extending diametrically through the coupling head 1.

By means of the means 3, together with the sliding blocks 4, being designed to in a suitable manner fill the cylindrical recess 5 transversely through the coupling head 1, and by means of its furthermore being provided with ends designed as spherical surfaces 15, the means 3, together with the spindle 8, can carry out restricted swinging movements in all directions in relation to the coupling head 1, whereby the entire arrangement obtains the charactor of a universal joint. The means 3 receives longitudinal positioning by means of its ends or spherical surfaces 15 abutting the inside of a casing 16 surrounding the coupling head 1 and fixed in relation to the same, for example, by means of bolts 17. Beyond fixing the longitudinal position of the means 3 in the cylindrical recess 5, the casing 16 also holds the sliding blocks in the spaces intended for them between the means 3 and the wall in the cylindrical recess 5. Furthermore, the casing 16 also serves to cover both ends of the cylindrical recess in the coupling head 1. By means of this covering, the spaces for both of the pairs of sliding blocks 4 are sealed outwardly as regards lubricating grease. In order to ensure that the sliding block spaces are also inwardly sealed with respect to lubricating grease, annular seals in the form of rubber discs 17 are suitably arranged between the wall in the cylindrical recess 5 in the coupling head 1 and the means 3 arranged in said recess. These seals or discs 17 are situated inside the ends of the means provided with projections or recesses and are held in annular grooves 18 in the means while their outer edges abut the wall in the recess 5. In order to further ensure that the lubricating grease spaces in the coupling head are not emptied, the casing 16 around the coupling head 1 is also sealed in relation to the same by means of a pair of O-rings 19 which are situated in annular grooves about the coupling head near both ends of the casing 16, the inner sides of said edges being abutted by said O-rings.

As is evident from FIG. 4, the surfaces of the ends of the means 3, between each pair of flats 10 at each end of means 3, converge endwise outwardly. It will be evident from a comparison of FIGS. 1, 2 and 4, that this endwise outward convergence permits oscillatory movement of the means 3 about the axis of the bore 13 as seen in FIG. 4, without interference with the side walls of the cylindrical recess 5. At the same time, however, movement of the blocks 4 is limited to movement axially of recess 5. Thus, as is evident from the drawing, blocks 4 slide on flats 10 in both directions, whereby a desirably large contact area between blocks 4 and flats 10 is preserved, at the same time that a maximum degree of freedom of the means 3 is achieved.

The invention is not restricted to the embodiment described herein and shown in the drawings. It can be modified in manifold ways within the scope of the claims.

What I claim is:

1. A sliding block coupling for interconnecting an input driving member and an output driven member in torque transmitting relationship, comprising a rotatable coupling head having a cylindrical recess perpendicular to the axis of rotation of the head, elongated means extending lengthwise of said recess, one of said members being coupled against rotation relative to said means, the other of said members being coupled against rotation relative to said head, said elongated means having flats on opposite sides of each of its ends, the surfaces of said ends between the two said flats at each end of said elongated means converging endwise outwardly to permit oscillatory movement of said means about an axis perpendicular to the axis of said cylindrical recess, sliding blocks disposed in said recess on opposite sides of said rotation axis and on opposite sides of each of said ends, said blocks having flat surfaces that slide on said flats, said blocks and said cylindrical recess having interengaging sliding surfaces that limit movement of said blocks relative to said means to directions perpendicular to said rotation axis, annular seals that seal between said means and said walls of said recess, said seals being disposed on opposite sides of said rotation axis, between said sliding surfaces and said rotation axis, and means closing both ends of said cylindrical recess.

2. A coupling as claimed in claim 1, said closing means comprising a casing surrounding the coupling head.

3. A coupling as claimed in claim 2, said head having a cylindrical outer contour, said casing comprising a cylindrical sleeve, annular sealing means coaxial with said rotation axis and sealing between said head and said casing on opposite sides of said recess, and means detachably securing said casing to said head.

* * * * *